United States Patent [19]

Yamada

[11] Patent Number: 4,684,978
[45] Date of Patent: Aug. 4, 1987

[54] CORRECTION METHOD OF COLOR-SEPARATED SIGNALS

[75] Inventor: Mitsuhiko Yamada, Kyoto, Japan

[73] Assignee: Dainippon Screen Mfg. Co. Ltd., Kyoto, Japan

[21] Appl. No.: 748,750

[22] Filed: Jun. 25, 1985

[30] Foreign Application Priority Data

Sep. 18, 1984 [JP] Japan ............................. 59-193972

[51] Int. Cl.⁴ ............................................. H04N 1/46
[52] U.S. Cl. ....................................... 358/75; 358/78; 358/76
[58] Field of Search ................. 358/80, 75, 78, 76

[56] References Cited

U.S. PATENT DOCUMENTS 4,393,399 7/1983 Gast et al. ............................. 358/80
4,476,487 10/1984 Klie et al. ............................. 358/80
4,486,772 12/1984 Klie et al. ............................. 358/80

Primary Examiner—James J. Groody
Assistant Examiner—Robert M. Bauer
Attorney, Agent, or Firm—Rosen, Dainow & Jacobs

[57] ABSTRACT

Color-separated signals, which are adapted to fabricate color-separated printing plates, are subjected to ICR processing by the hand re-touching technique while watching them on a color monitor (which is employed to simulate printing results), thereby avoiding occurrence of localized irregularity in color tone. The method of this invention facilitates the ICR processing in a hand re-touching manner and at the same time, permits immediate observation of correction results while watching the progress of the processing on the color monitor.

11 Claims, 13 Drawing Figures

FIG. 6
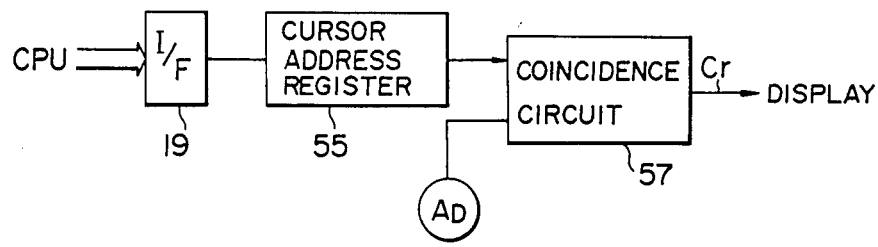
FIG. 7(a)
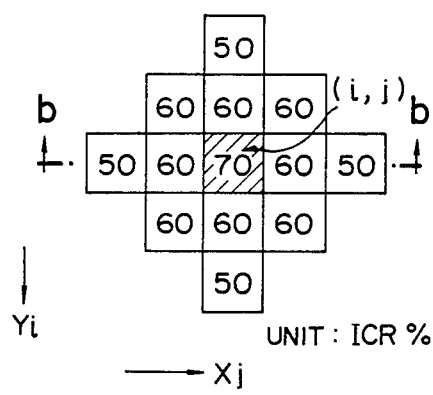
FIG. 7(b)
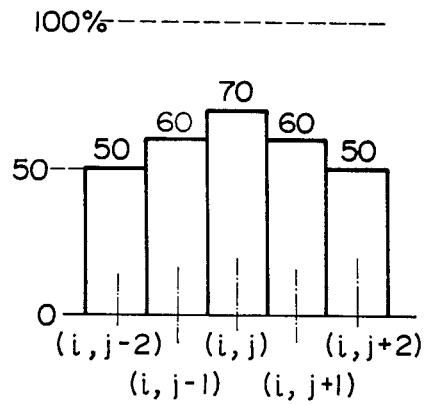
FIG. 8(a)
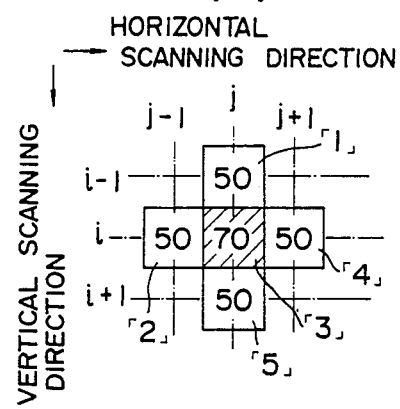
FIG. 8(b)
| | ABSOLUTE ADDRESS | RELATIVE ADDRESS |
|---|---|---|
| 1 | $i-1, j$ | $-1, 0$ |
| 2 | $i, j-1$ | $0, -1$ |
| 3 | $i, j$ | $0, 0$ |
| 4 | $i, j+1$ | $0, +1$ |
| 5 | $i+1, j$ | $+1, 0$ |

CORRECTION METHOD OF COLOR-SEPARATED SIGNALS

This method relates to an electronic color separation method useful in the fabrication of printing plates of different colors, namely, yellow (Y), magenta (M) and cyan (C) and an additional printing plate of black ink (K), which are in turn employed to reproduce a multicolored picture.

In conventional four-color reproduction making use of printing techniques, pictures are printed using inks of three different colors, namely, Y-, M- and C-inks principally. K-ink is also used as an auxiliary in order to expand the reproducible density range because the reproducible density range available from the use of the former three colors is not sufficient.

Such a printing method is called "skeleton black". On the other hand, it may also be contemplated to replace a neutral color component by a black ink so as to print neutral color areas with a black ink as much as is permissible. This printing method is called "full black".

Between the above-mentioned printing methods both of which use a black printing plate, a great many black printing plates of different types may be contemplated by changing the proportion of the neutral component to be replaced by the black ink. In accordance with the amount of the ink to be provided from each black printing plate, it is necessary to reduce the amounts of the remaining three inks, i.e., Y-, M- and C-inks. This procedure is called undercolor removal (UCR).

As a black printing plate approaches "full black", more and more Y-, M- and C-inks which are expensive will be replaced by economical K-ink, thereby achieving the advantages that the overall ink cost will be lowered, the reproducibility of the neutral color component will be facilitated and the printing work will also be facilitated. However, black printing plates relatively close to "skeleton black" are generally used in a large number for such reasons that the qualities of fabricated printing plates cannot be easily judged. Black printing plates of "full black" or of types close to "full black" have not found any substantial commercial utility.

However, the merits of the above-described "full black" have recently started attracting interest again. Accordingly, the popularity of a printing method in which the neutral color components of the three colors, i.e., Y-, M- and C-colors are replaced either entirely or as much as possible by K-ink has begun to increase.

Simply speaking, colors can be reproduced with ink or inks of 1-3 colors in the above method provided that the amounts of neutral colors are entirely replaced with K-ink at areas where Y-, M- and C-inks are printed one over another. As a rule, it is found that at every point on each print, its respective color can be reproduced with at most three colors out of the four colors.

When portions of inks of the three colors, i.e., Y-, M- and C-colors, which portions correspond respectively to the neutral color components, are respectively replaced by one color only, namely, the K-ink, the overall color ink consumption will be reduced so that a significant contribution will be made to the reduction of printing cost and the control of the printing work will also be facilitated.

When portions of the inks of the three colors, i.e., Y-, M- and C-colors which portions correspond respectively to the neutral color were simply replaced in their entirety by K-ink at areas requiring the three inks, i.e., Y-, M- and C-colors in large amounts, in other words, at areas having high neutral color densities without making any modifications to a conventional color scanner, it was however not possible to obtain any good printing results because the density, which K-ink was able to reproduce on a sheet of printing paper, was normally insufficient compared with densities which had been reproduced conventionally by overlapping the three inks, i.e., Y-, M- and C-inks and K-ink (the skeleton method).

In order to solve such a drawback, the present applicant has already proposed correction methods for insufficient densities of K-ink in Japanese Patent Application Nos. 249542/1983 and 249543/1983. Furthermore, Japanese Patent Laid-open Nos. 173838/1982 and 190951/1983 disclose means for saving consumption of the inks of three colors, i.e., Y-, M- and C-inks by increasing the amount of K-ink without deleteriously affecting the gray balance.

However, such a procedure as replacing portions of the inks of three colors, i.e., Y-, M- and C-colors, which portions correspond to the density of the neutral color, by K-ink and subtracting the thus-replaced portions respectively from the amounts of the inks of three colors while taking into consideration the color-blending characteristics of the three inks, the density characteristics of K-ink, etc. is not simple. Namely, an increase or decrease in the amount of one of the inks will always affect the amounts of the remaining two inks because each of the inks also contains ink components of the remaining colors, in other words, color-blending components to some extents. As a result, such a correction which features an increase or decrease in the amount of each of one or more inks goes round in circles. A color calculation circuit which may be able to solve such a problem to a certain acceptable degree is accompanied by such drawbacks that it is very complex and its color correction procedure is also complicated.

The undercolor removal (UCR) processing may be effected fully, namely, to 100% by replacing portions of the inks of three colors, i.e., Y-, M- and C-inks, which portions correspond to the concentration of the neutral color, with K-ink and adding the three inks, i.e., Y-, M- and C-inks in amounts equivalent to the neutral color density insufficiency by the sole addition of K-ink at a high density. This procedure will hereinafter be called "ICR (Integrated Color Removal) processing".

Compared with the ICR processing, the UCR processing features easier control and easier prediction of printing results as the UCR processing is a one-way conversion processing for making black printing plates closer from the "skeleton black" type to the "full black" type. On the other hand, closed-loop feedback control such as that required for minimizing the amounts of color inks to be used will be complex in the UCR processing because it is open-loop processing.

Although the ICR processing permits closed-loop high-degree feedback control processing as it allows interconversion between "skeleton black" and "full black", the conventional ICR processing tended to result in corrections, which went round in circles as mentioned above, and hence rendered high-degree corrections difficult.

Furthermore, in the conventional ICR processing, the levels of color-blending components in each color ink were taken as parameters into consideration only in terms of proportions of the mingled other color components which proportions were respectively constant throughout the density range. If one attempts to make a color correction by taking the reciprocity law failure as an additional parameter into consideration, the color calculation circuit and its operation setting will become still more complex, thereby making the ICR processing impractical.

The conventional ICR processing can perform real-time processing in color corrections or calculations for a color scanner. Since the processing is performed real-time as open-loop processing in a feedback loop, the conventional ICR processing can perform ICR processing only.

Therefore, conventional ICR processing cannot meet such a demand that processing classified at a suitable point between the UCR processing and the ICR processing may be chosen depending on each picture pattern or element. Under the circumstances, the merit of the ICR processing, namely, the possibility of interconversion between the ICR processing and UCR processing in that the ICR processing permits UCR processing, to say nothing of its inherent processing, ICR processing has not been fully utilized.

With the foregoing in view, an object of this invention is to fabricate multi-color color-separated printing plates, which permits reduction to color inks to be used, by making use of the merit of the UCR processing and that of the ICR processing. Another object of this invention is to subject color-separated signals, which are adapted to fabricate such color-separated printing plates, to ICR processing by the hand re-touching technique while watching them on a color monitor (which is employed to simulate printing results), thereby avoiding occurrence of localized irregularity in color tone.

In one aspect of this invention, there is thus provided a method for correcting color-separated signals in advance in order to make the color tone of printing results better which comprises:

storing color-separated signals corresponding to the amounts of respective inks in a first memory device;

displaying the contents of the first memory device on a color monitor which is adapted to simulate the printing results;

designating the addresses of desired picture elements on the first memory device while making use of a picture displayed on the color monitor, and reading out color-separated signals of the desired picture elements from the designated addresses;

making changes to the black ink component of the read-out color-separated signals and readjusting the amount of the rest of the inks so as to obtain a color tone equivalent to the original color-separated signals;

storing the readjusted color-separated signals in a second memory device at an address corresponding to the picture element of the original color-separated signal;

applying flags to picture elements in which the amounts of the respective inks have been readjusted and storing the flags in a third memory device at addresses corresponding to their original picture elements; and storing values, which indicate the degrees of changes of the new black ink components relative to the corresponding original black ink components, in a fourth memory device at addresses corresponding to the original picture elements upon readjusting the amounts of the respective color inks.

The method of this invention facilitates the ICR processing in a hand re-touching manner and at the same time, permits immediate observation of correction results while watching the progress of the processing on a color monitor.

It is also possible to make an easy correction to a picture, which has been subjected to the ICR processing in an automatic mode, in a hand re-touching manner. This allows improved work efficiency and at the same time, facilitates ICR processing which features high and uniform quality and no irregularity in color tone.

The above and other objects, features and advantages of the present invention will become apparent from the following description and the appended claims, taken in conjunction with the accompanying drawings, in which:

FIG. 6 is a block diagram illustrating one specific example of a cursor generator in FIG. 1;

FIG. 7(a) is a diagram showing the arrangement of picture elements and ICR % values given respectively to the individual picture elements;

FIG. 7(b) is a graph showing the ICR % values of the picture elements on the line b—b in FIG. 7(a);

FIG. 8(a) is a diagram showing the arrangement of picture elements and the relationship between temporary address numbers and ICR % values;

FIG. 8(b) is a diagram illustrating the relationship among the temporary address numbers, absolute address numbers and relative address numbers;

FIG. 9 is a circuit diagram of an address timing generating unit;

FIG. 10 is a circuit diagram of a brush element address generating unit; and

Figure 1:
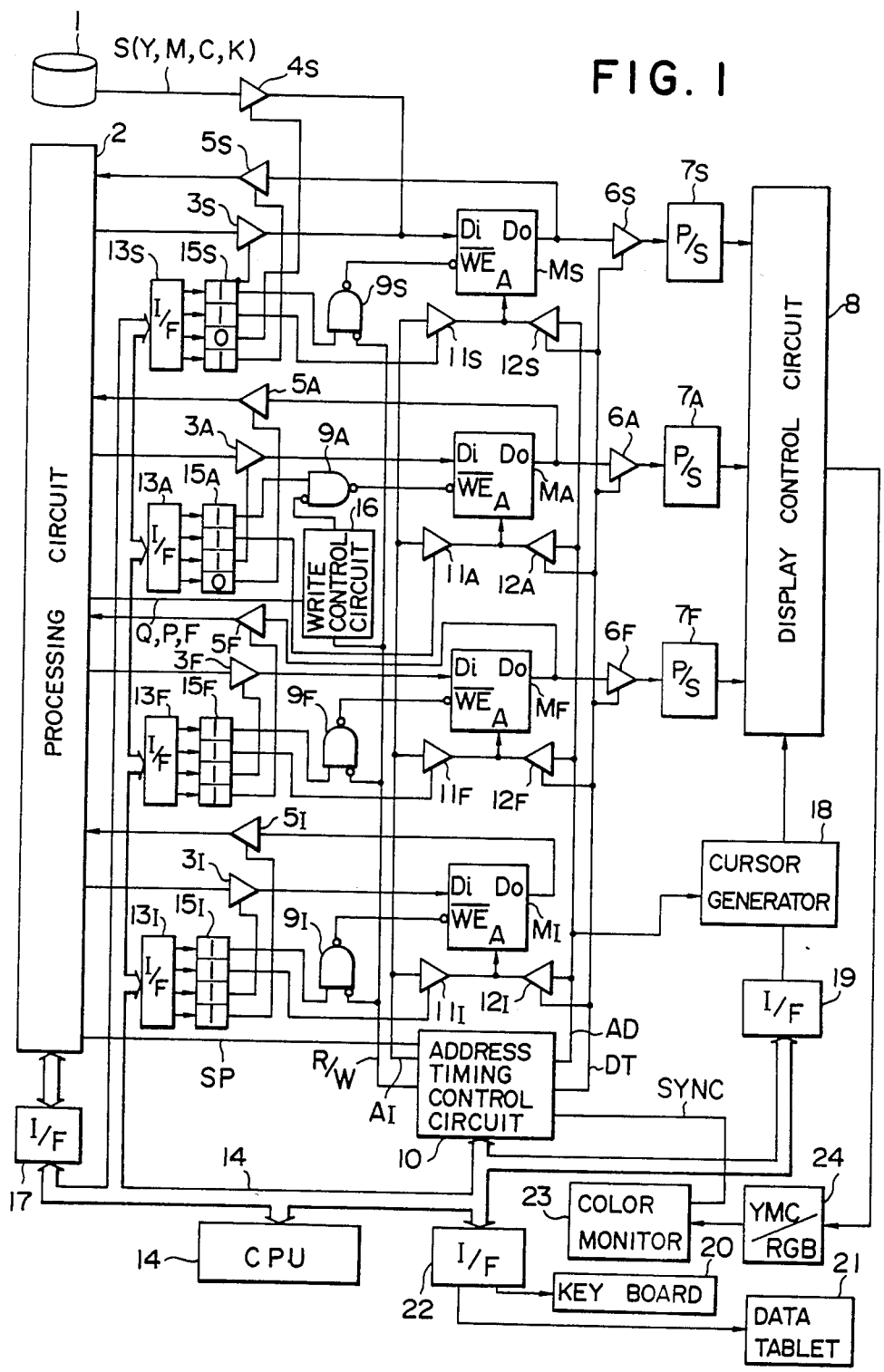
FIG. 1 is a circuit block diagram of a correction system for color-separated signals, which is adapted to practice the method of this invention.

The present invention will next be described in detail with reference to FIG. 1, which illustrates one example of the correction system for color-separated signals, said system being adapted to practice the method of this invention.

Numeral 1 indicates a source for source picture signals S to be processed in accordance with the method of this invention. As such a source, a large-capacity storage device such as magnetic disk is usually employed. In some instances, color scanners or receiving units of communication terminals may also be used. This embodiment is assumed to use a magnetic disk.

The source picture signals S stored in the magnetic disk 1 are color-separated signals subjected in advance to color separation by a color scanner, a color separation simulator of a color scanner or the like and composed of four printing ink colors, namely, yellow (Y), magenta (M), cyan (C) and black (K).

The source picture signals (S), i.e., color-separated signals are adjusted by taking the color correction, graduation correction and the like of a color scanner or simulator so that the finished results of the printing have good color tones. Here, the percent undercolor removal (hereinafter called "UCR%") is set at such a level so as not to allow the density of only the black ink to remain at each high-density area and not to result in an insufficient density as printed matter, in other words, to fabricate color printing plates rather close to the "skeleton black" type.

Namely, the color correction for making these source picture signals makes use of UCR %, which is principally intended for the reproducibility of color tone, is easiest to predict the effects of each correction such as color correction or the like, and is most suited for the density range of the original.

The source picture signals S obtained in the above-mentioned manner can provide prints having the highest color tone reproducibility available under the current printing techniques when individual color-separated printing plates. Under the circumstances, the reduction to the color inks to be used is not taken into consideration at all or is difficult to take into consideration.

$M_S$ indicates a first memory device of the RAM type as a buffer for the source picture signals S, which is loaded with the source picture signals S from the magnetic disk 1 to store them prior to a correction processing according to this invention.

Designated at $M_A$ is a second memory device of the RAM type as a buffer for corrected, namely, ICR-processed picture signals A, which serves to send the source picture signals S, read out from the first memory device $M_S$, to an ICR processing circuit 2 where the ICR-processed, namely, corrected picture signals A are stored.

$M_F$ designates a third memory device of the RAM type for flagging the ICR processing, which upon obtaining the corrected picture signals A, serves to store one bit of flags F indicating whether the individual picture elements of the picture signal A have been subjected to the ICR processing or not.

$M_I$ is a fourth memory of the RAM type for ICR % values, which serves to store ICR % values α representing how strong or how much the ICR processing was applied to the respective picture elements of the corrected picture signals A in the second memory device $M_A$.

Each of the first and second memory devices $M_S, M_A$ stores color-separated signals corresponding respectively to the four colors, i.e., the Y-, M-, C- and K-colors at a single address, for example, taking data for the four colors with 8 bits per each color data as pertaining to a single picture element.

Data stored at the same address in the first to fourth memory devices $M_S, M_A, M_F, M_I$ are correlated because they relate to the same picture element.

Data, which are to be written respectively in the first to fourth memory devices $M_S$–$M_I$, are fed from the ICR processing circuit 2 to their respective data input terminals $D_i$ by way of the corresponding bus drivers $3_S, 3_A, 3_F, 3_I$ when these bus drivers are ready to output data.

To the first memory device $M_S$, the source picture signals S are first delivered from the magnetic disk 1 and by way of a bus driver $4_S$ and the data input terminal $D_i$. Detailed description on the address timing and the like upon loading these source picture signals S are however omitted as they do not constitute the gist of this invention.

Data, which have been read out respectively from the first to fourth memory devices $M_S$–$M_I$, are sent from the data output terminals $D_o$ of the respective memory devices to the ICR processing circuit 2 via their corresponding bus drivers $5_S, 5_A, 5_F, 5_I$ when these bus drivers are ready to output data.

Furthermore, data which have been read out respectively from the first to third memory devices $M_S, M_A, M_F$, are fed by other bus drivers $6_S, 6_A, 6_F$ to a display control circuit 8 by way of their corresponding P/S (parallel/serial) converters $7_S, 7_A, 7_F$ when the bus drivers are ready to output data.

The write/read control of the first to fourth memory devices $M_S$–$M_I$ is effected respectively by outputs from gates $9_S, 9_A, 9_F, 9_I$ provided with write enable terminals $\overline{WE}$ of the respective memory devices.

Designation of addresses in the first to fourth memory devices $M_S$–$M_I$ is controlled by either ICR-processing address signals $A_I$ or display address signals $A_D$, both output from an address timing control circuit 10. Here, the timing of the control is in turn controlled by the output-ready timings of bus drivers $11_S, 11_A, 11_F, 11_I$ and $12_S, 12_A, 12_F, 12_I$ provided respectively in the address lines of the respective memory devices.

The bus drivers and gates provided for the ICR processing in the peripheries of the corresponding memory devices $M_S$–$M_I$ are controlled via ports I/Fs (interface) $13_S, 13_A, 13_F, 13_I$ provided corresponding to the respective memory devices, by designating desired ports by means of a central processing unit (CPU) 14.

The respective IFs $13_S$–$13_I$ feed status data, which have been output suitably from the CPU 14, to their corresponding status register $15_S, 15_A, 15_F, 15_I$ in accordance with port numbers output simultaneously with the status data. The status data then control bus drivers and AND gates, both, connected to their corresponding bits of the status registers $15_S$–$15_I$.

Figure 3:
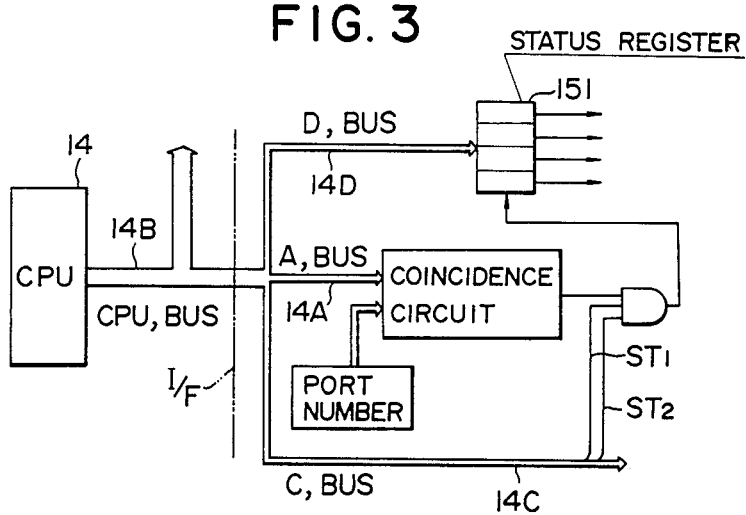
FIG. 3 is a block diagram illustrating one ordinary example for inputting status data to a status register.

For example, each of the I/Fs $13_S$–$13_I$ is, as illustrated generally in FIG. 3, controlled by receiving desired data from the data bus $14_D$, address bus $14_A$ and control bus $14_C$ in the bus line $14_B$ of the CPU 14.

Namely, when the CPU 14 has loaded a port number required to make a selection as to the lower 89 bits of the address bus $14_A$, the I/F corresponding to the port number is controlled by a status data/output signal $ST_1$ and status data/input timing signal $ST_2$ in such a way that it inputs the status data, which has been loaded on the data bus $14_D$ immediately after the loading of the port number, to a status register $15'$.

On the other hand, the respective gates $9_S$–$9_I$ which control respectively the writing and reading of the memory devices $M_S$–$M_I$ are controlled by read/write pulses (R/W) from the address timing control circuit 10. However, the gate $9_A$ for the second memory device $M_A$ is controlled, as will be described herein, by read/write pulses (R/W) by way of a read/write control circuit 16 shown in FIG. 4.

The respective bus drivers $6_S$–$6_I$ and $12_S$–$12_I$ which serve to control the display are controlled simultaneously by display timing signals (DT) from the address timing control circuit 10.

The display timing signals DT render the bus drivers $6_S$–$6^I$ and $12_S$–$12^I$ ready to output data upon displaying data from the corresponding memory devices.

The bus line $14_B$ of the CPU 14 is connected to the I/F 17 for the ICR processing circuit 2, an I/F built in the address timing control circuit 10, an IF 19 for a cursor generator 18, a keyboard 20 of an external input device and an I/F 22 for a tablet 21. These peripheral equipment are controlled by the CPU 14.

The display control circuit 8 receives, in accordance with displaying address signals $A_D$, all picture signals read out sequentially from each of the first to third memory devices $M_S, M_A, M_F$ and at the same time from the first to third memory devices as well as cursor coordinate data output from the cursor generator 18. In accordance with these input signals, picture signals output selectively as will be described herein are converted from the four color components of the ink, Y, M, C, and K to signals corresponding to the three color components of a color monitor 23, i.e., R, G and B. The thus-converted signals are then color-displayed on the screen of the color monitor 23 by way of a Y/R (YMCK system to RGB system) converter 24.

The conversion characteristics of the Y/R converter 24 are set beforehand by taking into consideration not only the characteristics of each ink, the color-producing characteristics of the color monitor 23, etc. but also even the proportional law failure and the reciprocity law failure, so that the color monitor 23 can simulate printing results to be obtained from the color-separated signals.

Figure 2:
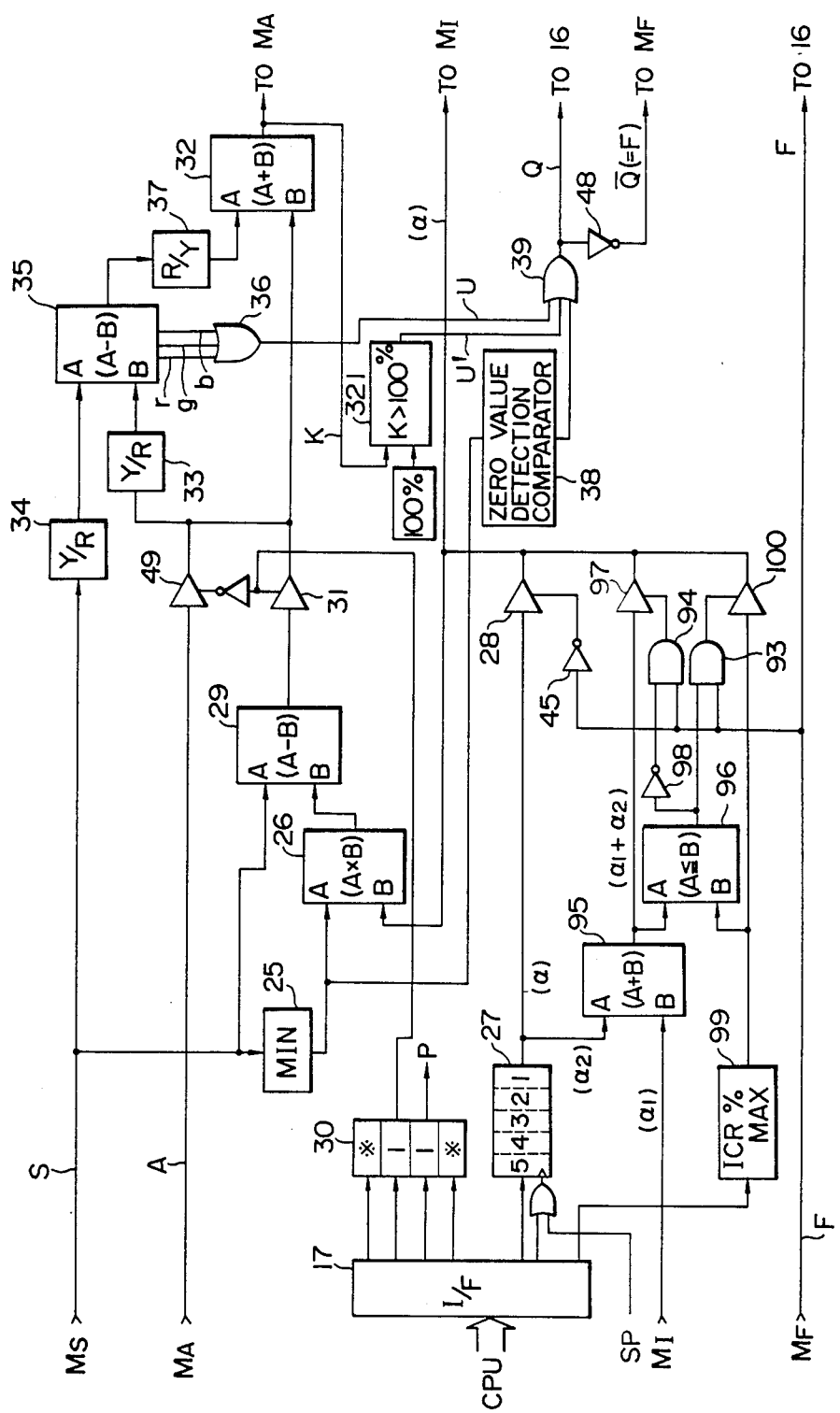
FIG. 2 is a block diagram showing one specific example of an ICR processing circuit in FIG. 1.

FIG. 2 illustrate the specific example of the ICR processing circuit 2. Based on this drawing, the outline of an ICR processing for obtaining the ICR-processed, i.e., corrected picture signals A from the source picture signals S will next be described, assuming that the ICR processing is effected automatically without using the hand-retouching technique.

The source picture signals S have already been loaded in the first memory device $M_S$ from the magnetic disk 1 via the bus driver $4_S$ prior to their ICR processing.

Upon designation of a desired primary correction mode and the auto mode to the CPU 14 by way of the keyboard 20, the CPU 14 sets status data $[1101]_S$, $[1110]_A$, $[1111]_F$, $[1111]_I$ to the respective status registers $15_S, 15_A, 15_F, 15_I$, which are adapted to control their corresponding memory devices, successively with the register corresponding to the first memory device $M_S$ being set first, as shown in the drawing.

In the following description, values designated by [ ] mean binary codes and logic symbols of individual bits of the binary codes.

Under the automatic primary correction mode, the address timing control circuit 10 designates the addresses of desired ICR processing address signals $A_I$ from one picture element to another while successively moving upward from the initial address. The source picture signals S read out by the address signals $A_I$ from the first memory device $M_S$ are then sent to the ICR processing circuit 2 as color-separated signals Y,M,C,K for the picture element unit.

With respect to the source picture signals S which have been input to the ICR processing circuit 2, a signal having the smallest value among the color components Y,M,C of each color-separated signals Y,M,C,K is then selected by a minimum value selection circuit 25.

Either one of the Y, M and C values, which has been selected by the minimum value selection circuit 25, is a residual equivalent neutral density ($N_S$) component left in the color ink components Y, M and C in accordance with the UCR % value of the UCR-processed source picture signals S provided that the three values are all zero or greater than zero.

One object of this invention is to replace some percentage of the above-described residual equivalent neutral density ($N_S$) by black ink (K) without impairing the reproducibility in color tone of the source picture signals S.

Thus, the residual equivalent neutral density $N_S$ is fed to a multiplier 26, where it is multiplied by the ICR % value $\alpha$ fed to the other input terminal of the multiplier 26.

The ICR % value $\alpha$ is set from the CPU 14, via the I/F 17, to the ICR % register 27. Under the auto mode, a desired ICR % value is set to the first bit of the ICR % register 27 and during the auto mode, the value is maintained.

The value $\alpha$ of the ICR % register 27 is sent to the multiplier 26 via the bus driver 28 as will be described herein, since in the case of the primary correction, the contents of the third memory device $M_F$ are all [0].

By the multiplier 26, the ICR % value $\alpha$ is multiplied by the residual equivalent neutral density $N_S$, thereby making it possible to determine an ICR equivalent neutral density ($N_I = \alpha N_S$) which indicates how much the predetermined color printing plate (i.e., one type of color printing plate classified somewhere between the "skeleton black" type and the "full black" type) has been modified toward the "full black" type by the UCR % of the original source picture signals S.

For example, the color printing plate is the same as that corresponding to the original picture signals S if $\alpha = 0\%$. It is of the "full black" type if $\alpha = 100\%$.

Each output of the multiplier 26 is sent to an adder/subtracter 29, which subtracts the ICR equivalent neutral density $N_I$ from each of the respective color components Y,M,C of each of the source picture signals S which have already been input to the adder/subtracter 29 and at the same time, adds the ICR equivalent neutral density $N_I$ to the black component K.

Namely, individual components $Y_{A'}$, $M_{A'}$, $C_{A'}$ and $K_{A'}$ of an intermediate corrected picture signal $A'$ are obtained as follows at the output terminal of the adder/subtracter 29:

$$Y_{A'} = Y - N_I = Y - \alpha N_S$$

$$M_{A'} = M - N_I = M - \alpha N_S$$

$$C_{A'} = C - N_I = C - \alpha N_S$$

$$K_{A'} = K + N_I = Y + \alpha N_S$$

In accordance with the contents of a status register 30 preset by the CPU 14 by way of the I/F 17, the intermediate picture signal $A'$ is caused to pass through a bus driver 31 controlled ready for output and is then fed to an adder 32 and a Y/R converter 33.

The source picture signals S are fed directly to another Y/S converter 34. The outputs of both Y/R converters 33, 34 are fed to a subtracter 35.

As to the details of the Y/R converters 33, 34 and the Y/R converter 24 disposed before the above-described color monitor 23, reference may be made to Japanese Patent Application No. 144792/1981 (now, Japanese Patent Laid-open No. 46341/1983) of the present applicant.

The source picture signals $S_R$ of the RGB system which have been output from the Y/R converter 34 are sent to the input terminal of the subtracter 35 for their subtraction. At the same time, the intermediate corrected picture signals $A'_R$ of the RGB system which have been output from the Y/R converter 33 are delivered to the input terminal of the subtracter 35 for their subtraction. The differences of the respective color components are obtained as respective color components $\Delta R$, $\Delta G$ and $\Delta B$ of the deviation picture signals ($\Delta A_R$) of the RGB system.

Namely, from the individual color components $R_S$, $G_S$ and $B_S$ of each source picture signal $S_R$ of the RGB system, the respective color components $R_{A'}$, $G_{A'}$ and $B_{A'}$ of the intermediate corrected picture signal $A'_R$ of the RGB type are calculated as $\Delta R = R_S - R_{A'}$, $\Delta G = G_S - G_{A'}$, and $\Delta B = B_S - B_{A'}$.

Upon effecting the above calculation, it is checked if [1] is contained respectively in the borrow bits r,g,b of the respective color components in order to detect if any of the color components $\Delta R$, $\Delta G$ and $\Delta B$ of the deviation picture signal $\Delta A$ has a negative value.

These borrow bits r,g,b are OR-operated at the OR gate 36, resulting in an output of a record-stopping signal (U) as an output of the OR gate 36 whereby to invalidate the corresponding corrected picture signal A' of the picture element as a signal subjected to an improper ICR processing.

The deviation picture signals ($\Delta A_R$) of the RGB system, which have been output from the subtracter 35, are converted by an R/Y (RGB system to YMCK system) converter 37 to four, namely, YMCK ink components $\Delta Y$, $\Delta M$, $\Delta C$ and $\Delta K$ of the original system, which are then fed as deviation picture signals ($\Delta A$) of the YMCK system to the above-mentioned adder 32.

The adder 32 adds the intermediate corrected signals A' and deviation picture signals $\Delta A$ in accordance with the color components and outputs the respective color components of the primary corrected picture signals $A_1$ as $Y_{A1} = Y_{A'} + \Delta Y$, $M_{A1} = M_{A'} + \Delta M$, $C_{A1} = C_{A'} + \Delta C$ and $K_{A1} = K_{A'} + \Delta K$.

The primary corrected picture signals $A_1$ which have been output from the adder 32 are then fed to the data input terminal $D_i$ of the second memory device $M_A$ and only where these picture signals $A_1$ have been subjected to the proper ICR processing, they are stored at addresses corresponding to the picture elements of the source picture signals S, for example, at the same addresses in the memory device $M_A$.

A comparator 321 outputs a record-stopping signal U' when out of the respective color signals output from the adder 32, the K-color signal is in excess of 100%.

Figure 4:
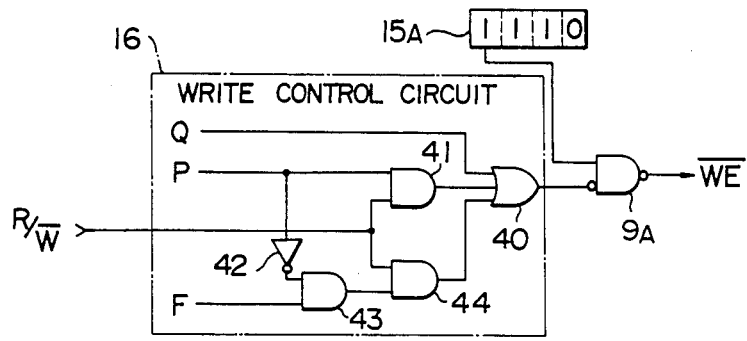
FIG. 4 is a circuit diagram showing one specific example of a read/write control circuit in FIG. 1.

It is controlled by the write control circuit 16 shown in FIG. 4 whether the corrected picture signals $A_1$ should be recorded or not.

The write control circuit 16 have already been input with a write inhibiting signal Q, write command signal P preset in the status register 30, ICR processing flag F recorded in the third memory device $M_F$ and read/write pulse (R/W) from the address timing control circuit 10.

The write inhibiting signal Q is obtained by subjecting a record-stopping signal U output from the OR gate 36, a record-stopping signal U' output from the comparator 321 and an output of a zero detection comparator 38 adapted to detect the zero value of residual equivalent neutral density $N_S$ output from the minimum value selection circuit 25 to an OR-operation at the OR gate 39. When writing is inhibited, the output is [1].

When the write inhibiting signal Q is [1] in the write control circuit 16, the output of the OR gate 40 is kept at [1], whereby to inhibit passage of a writing pulse $\overline{W} = [10]$ for the read/write signal (R/W). This write inhibiting signal Q has an inhibition level of the highest priority.

When the write command signal P is [1], it opens an AND gate 41 so that the writing pulse W of the read/write pulse R/W is allowed to pass and at the same time and the AND gate 43 is closed by way of an inverter 42, thereby making the priority level of the writing level higher than the flag F.

When the ICR processing flag F is [1], the signal corresponding to the ICR processing flag [1] is allowed to pass through the AND gate 43 and opens the AND gate 44 to permits the passage of the writing pulse W of the read/write signal (R/W) provided that the write command signal P is [0].

Whenever primarily-corrected picture signal $A_1$ for each single picture element is determined in the primary ICR processing, the picture signal $A_1$ is recorded only where it has been subjected properly to the ICR processing.

Where the residual equivalent density $N_S$ is zero, two or less color ink components are involved. Such picture elements do not require any ICR processing from the practical viewpoint. They are thus excluded.

Similarly, picture elements resulting in values greater than 100% are also excluded for a K printing plate which can bring about results greater than 100%, because no K printing plate can print beyond 100%.

Upon recording the above-mentioned corrected picture signals $A_1$ in the second memory device $M_A$, the ICR % values $\alpha$ employed for obtaining the corrected picture signals $A_1$ in accordance with the ICR processing are simultaneously recorded in the fourth memory device $M_I$ at addresses corresponding to the picture elements of the source picture signal S, for example, the same addresses as the picture elements.

The second to fourth memory devices $M_A$, $M_F$, $M_I$ are cleared in advance prior to the primary correction. Obviously, the ICR processing flags F of the third memory device $M_F$ are all set at [0] in the primary correction.

In the primary correction, [0]s of the ICR processing flags F which are read out successively from the third memory device $M_F$ are hence inverted to [1] by means of an inverter 45, whereby controlling the bus driver 28 ready for output as mentioned above.

When the write prohibiting signal Q is effective and [1], an inverted signal $\overline{Q}$ [0] is output from the inverter 48. Otherwise, [1]s are output and are written as ICR processing flags F in the third memory device $M_F$.

On the other hand, from the line through which ICR % values $\alpha$ are input to the multiplier 26, the ICR % values $\alpha$ are fed to the data input terminal $D_i$ of the fourth memory device $M_I$. The ICR % values $\alpha$ are stored at addresses corresponding to the picture elements of the source picture signals S, usually, at the same addresses of the source picture signals S.

When the primary ICR correction processing of all picture elements of the source picture signals S in the first memory device $M_S$ has been completed successively in the order of their addresses, only suitable signals out of the primary ICR-processed picture signals $A_1$ are recorded in the second memory device $M_A$, bits containing [1] as ICR processing flags F to indicate that the corrected picture signals $A_1$ have been recorded in the second memory device $M_A$ are recorded in the third memory device $M_F$, and ICR % values $\alpha$ at the time of the ICR processing are recorded in the fourth memory device $M_I$.

Incidentally, under the auto processing mode, the contents of the fourth memory device $M_I$ are all of the same value and no particular effects can be obtained from the provision of the fourth memory $M_{hd}$ I. This memory device $M_I$ can however bring about some effects upon effecting correction by the hand-retouching technique which will be described herein.

A description will next be made to outline how high-order ICR corrections ranging from the second-order correction to the $n^{th}$-order correction can also be made under auto modes.

In an $n^{th}$-order correction, the status register $15_A$ which is shown in FIG. 1 and relates to the second memory device $M_A$ is solely set at $[1111]_A$ so that the bus driver $5_A$ is controlled ready to output, whereby to read data out from the second memory device $M_A$ and then to input the data to the ICR processing circuit 2.

Furthermore, by setting the status register 30 of the ICR processing circuit 2 shown in FIG. 2 at [*00*], it is possible to control the bus driver 49, which is coupled at its output terminal with the output terminal of the bus driver 31 and is connected at its input terminal with the data output line of the second memory device $M_A$, ready for output.

When the bus driver 49 is controlled ready for output, the primary corrected picture signals $A_1$ which have been read out from the second memory device $M_A$ are loaded to the line through which the intermediate corrected picture signal $A'$ is delivered to the Y/R converter 33 and adder 32.

In the secondary correction, the subtracter 35 determines and outputs the deviations between the source picture signals S of the first memory device $M_S$ and the primary corrected picture signals $A_1$ of the second memory device $M_A$, namely, secondary deviations $\Delta A_2$.

These secondary deviations $\Delta A_2$ are added respectively to the primary corrected picture signals $A_1$ at the adder 32, thereby obtaining secondary corrected picture signals $A_2$. The secondary corrected picture signals $A_2$ are recorded at the place where the primary corrected picture signal $A_1$ have been recorded in the second memory device $M_A$.

This secondary correction processing is completed upon arrival at the final address. By repeating the processing again from the initial address in the same manner, it is possible to increase the order one by one so that high-order correction processing up to $n^{th}$-order can be carried out.

On the other hand, the contents of the first memory device $M_S$ and second memory device $M_A$ can be watched on the color monitor 23 by way of the display control circuit 8 by controlling the respective bus drivers $12_S$–$12_I$ for displaying address signals $A_D$ and the bus drivers $6_S$–$6_F$ of the data output line ready for output in accordance with the control signal (display timing signal) DT from the address timing control circuit 10.

The P/S converters $7_S, 7_A, 7_F$ interposed between the first to third memory devices $M_S, M_A, M_F$ and the display control circuit 8, all of which are shown in FIG. 1, are usual means for merely making the read-out speeds of the memory devices equal to the data transfer speeds required for their display. They are not required if the read-out speeds of the memory devices are fast.

Figure 5:
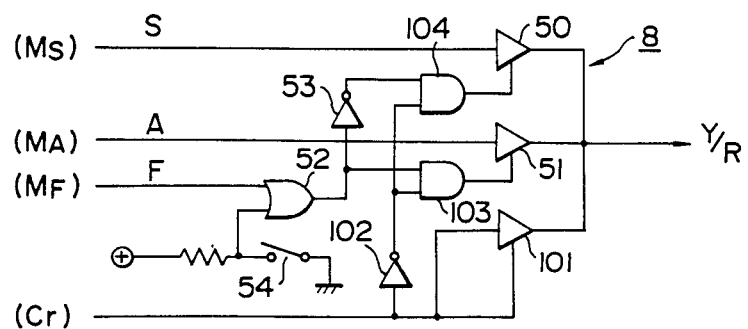
FIG. 5 is a circuit diagram depicting one specific example of a display control circuit in FIG. 1.

FIG. 5 shows one embodiment of the display control circuit 8.

Upon introduction of a cursor signal $C_r$ from the cursor generator 18, a bus driver 101 is rendered ready for output so that outputs from the bus drivers 50,51 are floated by way of a NOT circuit 102 and AND gates 103,104.

In the absence of the cursor signal $C_r$, the output terminal of the bus driver 101 is floated and the AND gates 103,104 are opened through the NOT circuit 102. The display control circuit 8 outputs the cursor signal $C_r$ to the Y/R converter 24.

When an manual operation switch 54 is opened, the put of the OR gate 52 remains always [1]. By way of the AND gate 103, the bus driver 51 is rendered ready for output so that the corrected picture signals A read out from the second memory device $M_A$ are output from the display control circuit 8.

When the manual operation switch 54 is closed, the bus driver 51 is rendered ready for output via the OR gate 52 and AND gate 103 provided that the ICR processing flag signal F read out from the third memory $M_F$ is [1]. Accordingly, the corrected picture signals A read out from the second memory device $M_A$ are output from the display control circuit 8.

When the manual operation switch 54 is closed and the ICR processing flag F is [0], the output of the OR gate 52 becomes [0], which is converted to [1] by the NOT circuit 53. Accordingly, the bus driver 50 is rendered ready for output by way of the AND gate 104, thereby outputting from the display control circuit 8 the source picture signals S read out from the first memory device $M_S$.

As described above, the display control circuit 8 is designed in such a way that in accordance with the priority order set by the circuit 8, the cursor $C_r$, corrected picture signals A and source picture signals S are switched over and displayed, address by address, owing to the functions of the bus drivers 50,51,101.

The picture displayed in the above manner on the color monitor 23 contains regions not subjected to the ICR processing and regions subjected to the ICR processing with their borders being in contact to each other, because pictures corresponding to the cursor or source picture signals S and those corresponding to the corrected picture signals A are alternately switched over by the cursor signals and flag signals F.

In the above case, irregularity in color tone may be produced along the border between both of the regions if the whole screen area is processed evenly by setting the strength of the ICR processing, namely, the ICR % value at a constant level. Such irregularity in color tone may show up remarkably especially when some of the individual color components of the signals $A_R$ of the RGB system have negative values and the ICR processing of such color components is forcedly stopped to skip their ICR processing.

It is also one object of this invention to smoothen each section where the irregularity in color tone has been produced by the ICR processing. As means for achieving the object, the present invention provides an ICR processing which makes use of the hand retouching technique.

For using the hand retouching technique on the display screen of the color monitor 23, there are the cursor indication method and the write pen indication method. In this invention, both methods may be practiced with ease. However, the following embodiments will be described on the basis of the cursor indication method.

On the screen of the color monitor 23, a cursor of a desired shape is produced movably to any points on the screen with such a high or low luminance, a special color, flickering or the like that makes the cursor readily distinguishable from pictures to be displayed.

For example, coordinate values designated by the data table 21 are input to the CPU 14. Then, the coordinate values are transferred via the I/F 19 to the cursor address register 55 of the cursor generator 18 which cursor address register 55 is shown in FIG. 6. The contents of the address register 55 are then compared with the displaying address signals $A_D$ at a coincidence circuit 57. With a timing at which the contents of the address register 55 and the displaying address signals $A_D$ are coincided, the cursor position signal $C_r$ is produced. On the basis of the signal $C_r$, a cursor of a suitable pattern is produced on the screen of the color monitor 23.

The cursor produced in the above manner on the screen can be moved as desired on the screen by changing the position of a pen which designates desired coordinate values on the tablet 21. It is also possible to shift the cursor freely on the screen as a temporary cursor to which nothing is acted. Upon designating by the temporary cursor desired picture elements of a picture displayed simultaneously on the screen, pen down signals of the pen are used.

The coordinate point designated as being ready for processing is usually only one picture element corresponding to the center of the cursor. Namely, this is the central picture element to be subjected to the ICR processing. In the present invention, the effects of correction are allowed to extend to certain peripheral picture elements around the designated picture element while gradually reducing the strength of the ICR processing. FIG. 7 illustrates one example of the manner for causing the effects to extend.

FIG. 7(a) shows the arrangement of peripheral picture elements, to which the effects of correction are allowed to extend from the coordinate point (i, j) as the central picture element of the cursor, and ICR % values $\alpha$ preset for the respective picture elements. FIG. 7(b) shows diagrammatically the ICR % values $\alpha$ of the picture elements arranged in a row along line b—b of FIG. 7(a).

As depicted in the drawings, the ICR % values $\alpha$ are gradually rendered smaller in order from the picture element closest to the central picture element, namely, the picture element corresponding to the selected coordinate point (i,j).

A processed region which corresponds to a cursor and has outwardly-extending effects of correction will hereinafter called "bruch". By ICR-treating picture elements respectively with ICR % values $\alpha$ designated respectively for the picture elements in the brush while tracing the boundary between the region not subjected to the ICR processing and the region subjected to the ICR processing with the brush, the boundary can be changed to a boundary with relatively smooth irregularity without changing the ICR % values $\alpha$ significantly.

FIG. 8(a) illustrates another example of brush similar to that depicted in FIG. 7(a). This is one example of brush having the simplest arrangement of picture elements. Based on this brush, an ICR processing making use of the hand retouching method will be described specifically.

Figure 9:
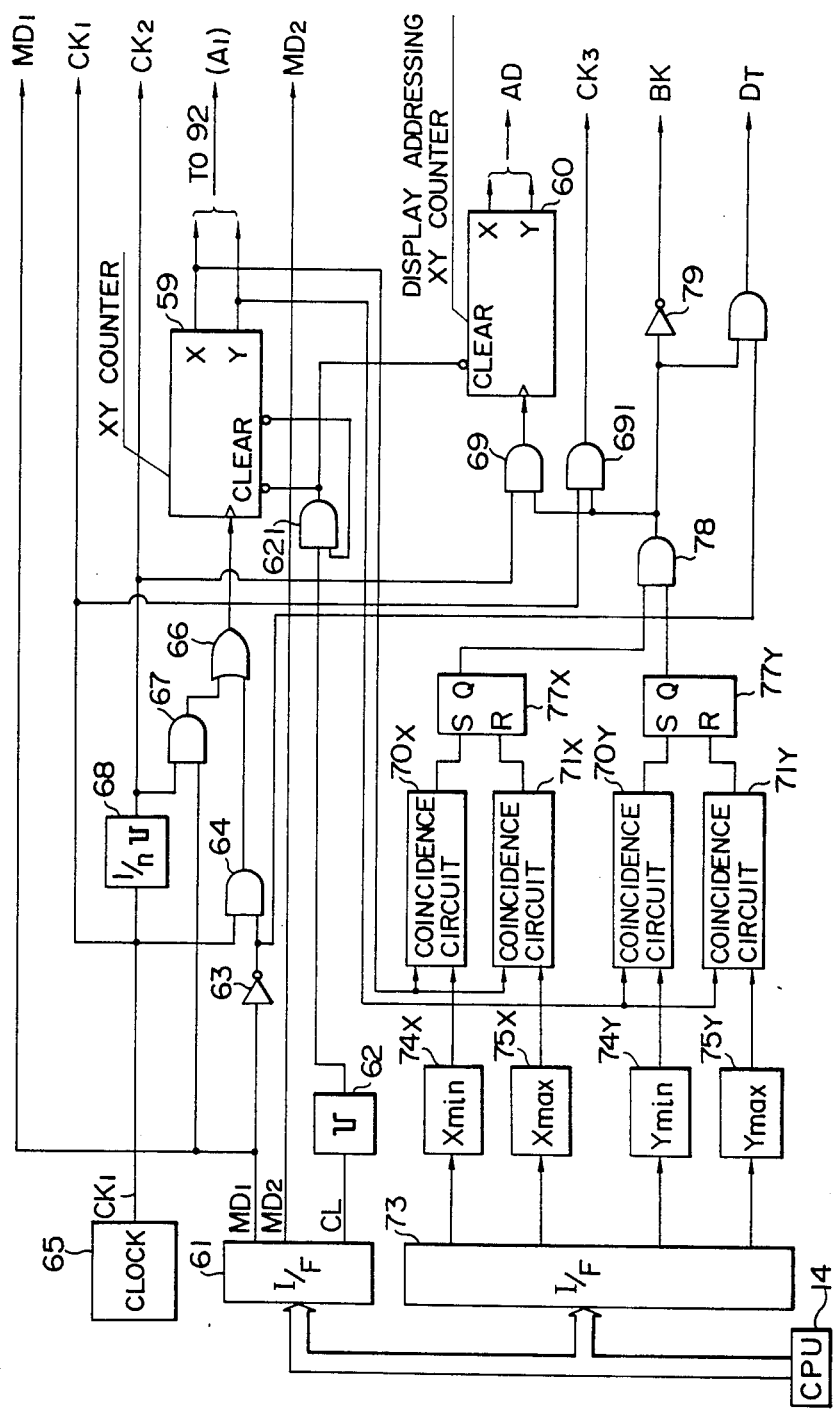
FIGS. 9 and 10 show specific examples of an address timing control circuit in FIG. 1, namely.
Figure 10:
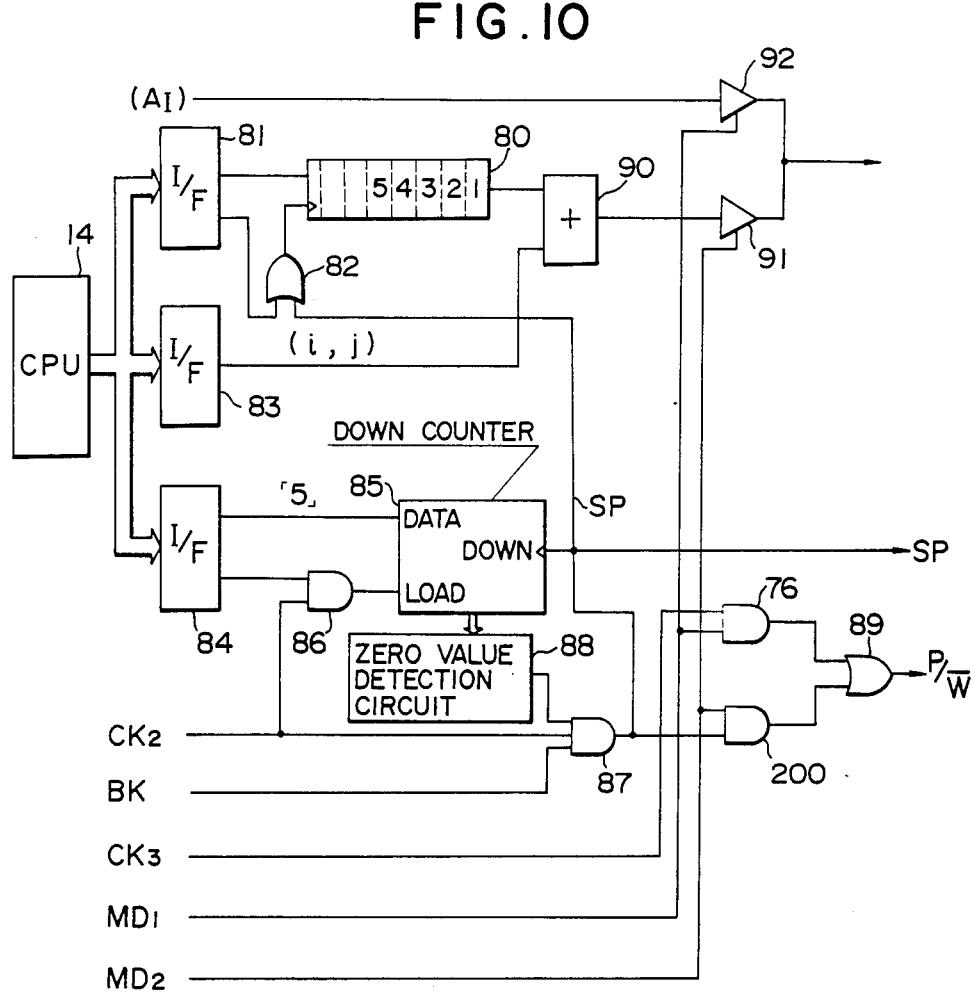

FIGS. 9 and 10 illustrate one specific embodiment of the address timing control circuit 10. FIG. 9 shows an address timing generation unit, while FIG. 10 depicts an address generation unit for brush picture elements.

In FIG. 9, XY counter 59 generates ICR processing address signals $A_I$ for reading data picture element by picture element from or writing data picture element by picture element in the respective memory devices $M_S$–$M_I$. It serves as an address counter of the auto correction processing mode upon effecting the above-described automatic correction.

In a brush processing to be described below, the XY counter 59 serves as a coordinate counter for making the blanking period indicated by hatching in FIG. 11. A synchronizing signal (SYNC) for the color monitor 23 is also generated in synchronization with the blanking signal shown in FIG. 11. Any known technique may be used for this purpose. Since it is not an object of this invention, neither drawings nor description will be given with respect to the manner of producing such synchronizing signals.

An xy counter 60 is a display address generator exclusively for reading out display data. It outputs display address signals $A_D$ for designating the addresses of n-pieces of picture elements on the memory device in parallel at the same time so as to output read-out data picture element by picture element in parallel.

By the way, the switching from the address bus line capable of designating an address picture element by picture element to the address bus line capable of designating addresses of n pieces or picture elements at once and vice verse can be effected easily by a technique commonly employed in the art. Means for effecting such a switching operation is thus omitted to avoid complex drawings. Furthermore, the output data line is also shown in a simplified form.

The XY counter 59 operates as a counter for generating the synchronizing signal (SYNC) and blanking signal (BK) for generating addresses for ICR processing or for display purposes. When status data [*001] are set at the status register of the I/F 61, [1] is set at the least counter clear bit (CL) so that the XY counter 59 is cleared via the mono-multi 62 and AND gate 621 to reset the count value to the initial value (X=0, Y=0).

When status data [*100] are set at the status register of the I/F 61 after the above resetting operation, [1] is set at the third bit, namely, the auto mode designation bit (MD$_1$). Accordingly, the AND gate 67 is opened so that the first clock pulse CK$_1$ of the clock generator 65 is divided, in view of the access time of the memory, into 1/n by the 1/n divider 68, which is thereafter input to the XY counter 59 via the corresponding AND gate 67 and OR gate 66.

This XT counter 59 counts the second clock pulses (CK$_2$) to output the ICR-processing address signal $A_I$.

When status data [*000] or [*010] are set at the status register of the I/F 61 after the resetting operation, the auto mode designation bit MD$_1$ is set at [0]. Therefore, the AND gate 67 is closed and the AND gate 64 is opened by way of the inverter 63. This AND gate 64 outputs first clock pulses CK$_1$ to the OR gate 66.

The XY counter 59 operates as a counter for generating the synchronizing signal (SYNC) for display purposes and blanking signals (BK).

The second clock pulses CK$_2$, which have been divided into 1/n, are input to the AND gate 69 ON/OFF-controlling the input of clock signals to the displaying xy counter 60. Only when the AND gate 69 is kept open, the AND gate 69 sends the second clock pulses CK$_2$ to the xy counter 60 so that the xy counter 60 outputs the displaying address signals $A_D$.

When the auto mode designation bit MD$_1$ is set at [0], the XY counter 59 proceeds with its counting operation in accordance with first clock pulses CK$_1$. Its counted values X and Y are both sent to coincidence circuits $70_X, 70_Y, 71_X, 71_Y$ for both coordinates X,Y, which constitutes a mask circuit and detects the minimum and maximum values.

In connection with the coincidence circuits $70_X, 70_Y, 71_X, 71_Y$, the respective coordinate values $(X_{min}, Y_{min})$ and $(X_{max}, Y_{max})$ have been loaded in advance prior to the designation of the display mode from the CPU 14 to an X-coordinate minimum value register $74_X$, Y-coordinate minimum value register $74_Y$, X-coordinate maximum value register $75_X$ and Y-coordinate maximum value register $75_Y$.

Outputs obtained upon establishment of coincidence at the minimum value coincidence circuits $70_X, 70_Y$ respectively set X-coordinate and Y-coordinate flip flops $77_X, 77_Y$. When both flip flops $77_X, 77_Y$ have been set, their outputs open the AND gate 69 by way of the AND gate 78 so as to allow the xy counter 60 to proceed with counting.

Outputs obtained upon establishment of coincidence at either one or both of the maximum value coincidence circuits $71_X, 71_Y$ reset the corresponding flip flops $77_X, 77_Y$ so that the output of the AND gate 78 is changed to [0]. Thus, the AND gate 69 is closed and the xy counter stops its counting operation.

The XY counter 59 continues counting at the minimum values $X_{min}, Y_{min}$ or so even after both maximum values $X_{max}, Y_{max}$. Carriers are produced at preset values $X_n, Y_m$, whereby to clear the XY counter 59 via an AND gate 621.

Two AND gates 621 are required, one for counting X and the other for counting Y. In order to simplify the drawing, only one AND gate 621 is depicted collectively. The XY counter 60 is also cleared in the same manner as the XY counter 59.

Figure 11:
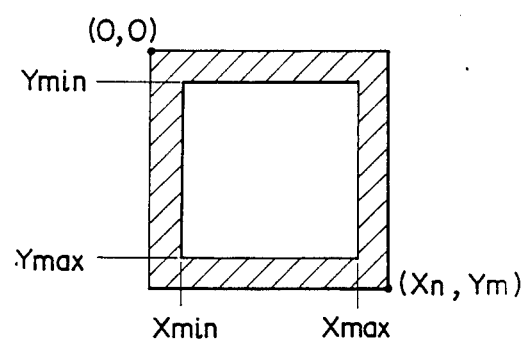
FIG. 11 is a diagram illustrating the manner of display address counting.

The outer frame shown in FIG. 11 indicates the counting range of the XY counter 59, while the inner frame depicted in FIG. 11 indicates the counting range of the xy counter 60. The hatched area indicates the blanking period in which the AND gate 69 is closed by an output from the AND gate 78 so that the count of the xy counter 60, namely, the displaying address signal AD do not proceed any further.

Thus, the output of the AND gate 78 is inverted by the inverter 79 and the thus-inverted output is output as the blanking signal BK.

Outputs of the AND gate 691 are employed as synchronizing clock pulses CK3 for the P/S converters $7_S, 7_A, 7_F$ depicted in FIG. 1.

When status data [*010] are set at the status register of the I/F 61 following the output of the clear signal SL, both counters 59, 60 function in the same manner as mentioned above but [1] is set at the second bit of the status data, i.e., the display correction mode designation bit $MD_2$, whereby designating the simultaneous processing mode, under which the display and correction are effected at the same time, and using the temporary cursor as an effective cursor to perform the brush correction.

A description will next be made supposing that the display mode is simply designated when the display and correction mode designation bit $MD_2$ is "0" and the display and correction mode is designated when it is "1".

FIG. 10 illustrates one example of a circuit for performing the brush correction processing specifically by using the arrangement of picture elements of brush shown in FIG. 8(a) and the CIR % values α given to the respective picture elements.

The brush may take a variety of patterns as depicted in FIG. 7(a) and FIG. 8(a). The shape of the pattern is different from the shape of the cursor pattern on the color monitor 23.

As shown in FIGS. 8(a) and 8(b), temporary address numbers are given to the respective picture elements of the brush pattern, for example, by giving $X_j$ and $Y_i$ respectively to the horizontal scanning direction and vertical scanning direction and numbering the picture elements in the order of their scanning.

The absolute addresses of the individual picture elements, to which the temporary address numbers "1" .. ."5", on the memory device can be easily determined, as shown in FIG. 8(b), from their relative addresses to the central picture element "3" once the absolute address (i,j) of the central picture element "3" is determined.

Accordingly, the relative addresses corresponding to the temporary addresses of the brush are loaded in advance, as offset addresses to the central picture element, in the order of the numbers of the temporary addresses from the CPU 14, via the I/F 31, to the offset value register 30 of the first-in-first-out memory type.

The number of data which the register 30 can store is set somewhat greater in advance so that the register 30 can store the numbers of entire picture elements of various patterns of the brush. When the data on the respective offset addresses have been set initially at the register 80, the data of the temporary address No. 1 are sent in advance, by a shift pulse from the I/F 81, through the OR gate 82 so that the data enter the beginning of the register 80.

A buffer register, I/F 83, is loaded with the central coordinate value (i,j) of the cursor, which is set when the temporary cursor is rendered to be an effective cursor by the above-described pen down signal or the like.

The I/F 84 receives the total picture element number "5" of the brush from the CPU 14 and loads the value "5" to the down counter 85 at the timing obtained by AND-operating the data sending signal from the I/F 84 and second clock pulse $CK_2$ at the AND gate 86.

The picture element number "5" which has been loaded to the down counter 85 is counted down by pulses output from the AND gate 87, which pulses are fed to the count-down input terminal. The thus-counted value is then fed to a zero detection circuit 88.

An AND gate 87 is opened to permit the passages of the second clock pulses $CK_2$ when the input to the zero detection circuit 88 is greater than zero, namely, the output signal is [1] and the aforementioned blanking signal BK is [1].

The second clock pulses $CK_2$ which have passed through the AND gate 87 count down the down counter 85 as shift pulses (SP) and at the same time, shift the data of the register 80 one by one toward the beginning thereof by way of the OR gate 82 for the register 80.

On the other hand, shift pulses (SP) output from the AND gate 87 are allowed to pass an AND gate and the OR gate 89, both opened by [1] of the mode designation bit $MD_2$ under the correction mode, and are then output as read/write signals (R/W) for the respective memory devices $M_S$–$M_I$.

The correction mode is the display and correction mode when "1" has been established at the mode designation bit $MD_2$.

A bus driver 91, which loads each output of an adder 90—which is adapted to add the leading output data of the register 80 and the absolute address numbers (i,j) corresponding to the center of the cursor—on an address bus line for reading picture elements one by one from each memory device or writing picture elements one by one in each memory device, is rendered ready for output.

When [1] has been established at the auto mode designation bit $MD_1$, a bus driver 92 for the address signals $A_I$ is ready for output. In this case, the AND gate 76 is simultaneously opened by the same signal $MD_1$ so that third clock pulses $CK_3$, which have been input to the AND gate 76, are allowed to pass.

The third pulses are output from the OR gate 89 as read/write signals (R/W) of the auto mode. In view of the relationship between the bus driver 91 and the bus driver 92, the correction mode ($MD_2$="1") under the auto mode ($MD_1$="1") is erroneous.

Values, which have been obtained by adding the leading data of the register 80 to the absolute address numbers (i,j) corresponding to the center of the cursor under the correction mode ($MD_2$="1"), are output as absolute address numbers for the picture element corresponding to the temporary address numbers of the leading data.

Owing to the above arrangement, the absolute addresses of the respective picture elements of the brush are successively designated in the order of the temporary address numbers, in synchronization with the second clock pulses $CK_2$, only during the blanking period corresponding to the hatched area shown in FIG. 11, until the down counter 85 counts up the total number of the picture elements and reaches zero. Furthermore, the contents of the memory devices $M_A$–$M_I$ are rewritten so that flickering or a like problem will not occur on the color monitor 23 in association with the rewriting.

Based on the absolute address of each picture element of the brush which address is designated by the adder 90, the addresses of the first to fourth memory devices $M_S$–$M_I$ are designated picture element by picture element and the reading/writing timing is also controlled by the read/write signals (R/W) which have been obtained by the second clock pulses $CK_2$.

Here, the source picture signals S read out from the first memory device $M_S$ are delivered to the ICR processing circuit 2 illustrated in FIG. 2. Corrected picture signals A, which have been subjected to the ICR processing at the ICR processing circuit 2, are written at the same addresses as the addresses, from which the source picture signals S have been read out, in the second memory device $M_A$.

Then, the outline of practice of the ICR processing by the brush will be described on the basis of FIG. 2.

The ICR % register 27 depicted in FIG. 2 is a register of the first-in-first-out type, which is exactly the same as the offset value resister 80 in FIG. 10. The number of storable data in the ICR % register 27 and the manner of its initial setting are the same as those of the offset value register 80. Data set in the ICR % register 27 are ICR % values $\alpha$ of the respective picture elements corresponding to the temporary address numbers of the brush.

Under the auto and primary correction mode, a single ICR % value $\alpha$ is always set at the beginning of the register as mentioned above.

Prior to the setting of the brush processing mode, the source picture signals S have been loaded in advance on the first memory device $M_S$ and the rest of the memory devices, i.e., the second to fourth memory devices $M_A$,$M_P$,$M_I$ have already been cleared.

Then, the respective status registers $15_S$–$15_T$ and 30 are set with status data as shown in the drawing, namely, in the same manner as the auto correction mode. However, the auto mode designation bit $MD_1$ of the I/F 61 is set at "0" during the brush processing.

When the display and correction designation bit $MD_2$ of the I/F 61 is changed to "0" to designate the display mode under the above-set conditions, the contents of the first memory device $M_S$ are displayed on the color monitor 23 and the temporary cursor is also displayed at a desired point on the screen.

It is necessary to preset, through the keyboard 20, the CPU 14 which brush pattern should be matched to the cursor or which ICR % values should be given to the respective picture elements on the brush pattern Operations such as the above-mentioned selection of brush pattern, setting of ICR % values $\alpha$ and the like can be effected by an interactive operation, namely, by using a software. An optimum brush pattern can be easily designed in accordance with the contents of a picture to be displayed.

Upon completion of the designing of brush pattern, the above-mentioned data pertaining to the brush pattern are loaded respectively on the ICR % value register 27, offset value register 80 and down counter 85. In addition, the maximum value of the ICR % values $\alpha$ which will be referred to herein is also set at the same time as the brush pattern is designed.

Supposing that the brush shown in FIG. 8(a) was designed in the above manner, a further description will be made thereon.

Under the display mode, the temporary cursor is shifted, by way of the tablet 21, to an area on the displayed picture which area requires an ICR processing. Then, [1] is input to the display and correction mode designation bit ($MD_2$) by a pen down signal or the like, thereby changing the display mode to the correction mode.

Upon reaching the correction mode, the coordinate values (i,j) of the center of the cursor at this point are set in the register of the I/F 83. Based on the coordinate values, the addresses of the individual memory devices $M_S$–$M_I$ are designated picture element by picture element, successively, in accordance with the absolute addresses of the brush picture elements from its temporary address number "1" to its temporary address number "5".

The ICR processing circuit 2 processes, in the order of the temporary addresses of the brush, data read out from the respective memory devices $M_S$–$M_I$.

The source picture signals S, which have been read out from the first memory device $M_S$ absolute address by absolute address of the brush picture elements, are ICR-processed in the same manner as the primary correction under the aforementioned auto mode, thereby obtaining primary corrected picture signals $A_1$. The primary corrected picture signals $A_1$ are stored at the same addresses in the second memory device $M_A$.

Upon the above ICR processing, the ICR % register 27 outputs an ICR % value $\alpha$ stored at the beginning of register 27, which ICR % value α corresponds to the temporary address of the brush picture element. When the temporary address is "1" for example, $\alpha=50\%$ is output. When the temporary address is "3", $\alpha=70\%$ is output. When the temporary address is "5", $\alpha=50\%$ is output. By these values, the ICR processing is performed.

In the above-mentioned manner, the first to fifth picture elements of the brush are successively processed by the ICR % values α designated for these picture elements whenever each central coordinate values (i,j) of the cursor are designated. Then, as mentioned above, the corrected picture signals $A_1$ stored in the second memory device; $\bar{Q}$ as data for ICR flag F adapted to establish [1] upon storage of the corrected picture signals $A_1$ in the second memory device $M_A$, in the third memory device $M_F$; and the ICR % values α employed upon processing the corrected picture signals $A_1$, in the fourth memory device $M_I$.

The above brush processing is performed in such a manner that the processing of the all brush picture elements is completed one frame by one frame of the displayed picture by making use of the blanking period shown in FIG. 11.

Upon designation of a new coordinate point on the next frame of the displayed picture, a brush processing is performed about the coordinate point.

When the cursor is shifted while causing the brush to act almost continuously in the above-mentioned manner, each picture element on the memory device is address-designated a plurality of times so that the picture element is subjected to a multiple of ICR processing.

In the case of this multiple processing, upon processing the picture signals S,A which have already subjected once to ICR processing and have been stored respectively in the first and second memory devices $M_S, M_A$, the bus driver 28 for the ICR register 27 is rendered not ready for output via the inverter 45 and the AND gates 93,94 are opened by the flag F read out simultaneously with the processing of the picture signals S,A because [1] has already been established at their corresponding address, i.e., the flag F in the third memory device $M_F$.

The output of the ICR % register 27 is also input to the adder 95, in which the preceding ICR % value $\alpha_1$ read out simultaneously from the fourth memory device $M_I$ has already been input.

As a result, as the output of the adder 95 the sum ($\alpha_1+\alpha_2=50\%+70\%=120\%$) of the preceding, for example, the first ICR % value ($\alpha_1=50\%$) and the current, i.e., the second ICR % value ($\alpha_2=70\%$) is output.

The output of the adder 95 is sent to the comparator 96 and bus driver 97 so that when the output of the comparator 96 is [0], the bus driver 97 is controlled ready for output by way of the inverter 98 and the AND gate 94 opened by [1] of the flag F.

To the other input terminal of the comparator 96, the output of the ICR % maximum value register 99 in which the maximum value ($\alpha_{max}$) of the ICR % values α has been set has been input.

This ICR % maximum value ($\alpha_{max}$) is preset upon designing the above-described brush, taking the uniform processing of the ICR-processed areas as values for desired areas. If the ICR % value of the central picture element of the brush, for example, the ICR % value for the third picture element is set at 70%, changes in ICR % over the processed picture can be rendered smooth, namely, continuous.

The comparator 96 compares the above-described maximum value $\alpha_{max}$ of ICR %s with the sum ($\alpha_1+\alpha_2$) output from the adder 95 in the multiple processing. When the sum ($\alpha_1+\alpha_2$) does not reach the maximum value, the comparator 96 outputs [0] and renders the bus driver 97 ready for output by way of the inverter 98 and AND gate 94. Accordingly, the sum ($\alpha_1+\alpha_2$) is fed to the multiplier 26 and also to the fourth memory device $M_I$.

When the sum ($\alpha_1+\alpha_2$) of the adder 95 exceeds the maximum value $\alpha_{max}$, the comparator 96 outputs [1]. By way of the AND gate 93, the bus driver 100 is opened by [1] of the flag F. In other words, the bus driver 100 is controlled ready for output by way of the AND gate 93. The output of the ICR % maximum value register 99 which output is input to the bus driver 100, namely, the maximum value $\alpha_{max}$ of the ICR %s is sent to the multiplier 26 and the fourth memory device $M_I$.

With respect to areas in which each single picture element is subjected twice or more to the processing, namely, is multi-processed in the above manner, ICR % values α are added whenever the ICR processing is repeated. The sum is stored in the fourth memory. When the sum exceeds the maximum value, the ICR processing is performed with the maximum value $\alpha_{max}$ and the maximum value $\alpha_{max}$ is stored.

The brush is used by shifting the same with the cursor on the screen, on which the contents of the first memory is displayed, in such a way that the brush traces an area where the ICR processing is desired.

When the area requiring the ICR processing is relatively wide, the contour of the area is traced by the brush and the brush is then shifted as if the inside of the contour is painted out by the brush.

This painting-out operation and contouring operation can be effected with good work efficiency provided that the pattern of the brush is changed to design different shapes suited for individual operations.

When there is a localized section having an excessively high ICR % value within an area to be subjected to ICR processing by a brush, it is possible to set an extremely small negative value, for example, $-5\%$ or so to the ICR % value of the brush, whereby to correct the ICR processing in the opposite direction with respect to the area to be subjected to the ICR processing.

Although not specifically illustrated by a circuit diagram or so, it is readily possible to visually watch the trace of an effective cursor, not the temporary cursor, on the color monitor 23 by applying high-illuminance modulation to picture signals in accordance with the contents of the third memory device $M_F$, when display of such a trace is desired.

The high-order processing after the above-described primary correction by the brush processing can then be performed under the auto mode which was described at the beginning.

It is also possible to perform this brush processing even after ICR-processing the entire area beforehand under the auto mode. In this case, negative ICR % values $-\alpha$ are set to the respective picture elements of the brush and the brush processing may thus be applied to the inside of the ICR-processed area.

Having now fully described the invention, it will be apparent to one or ordinary skill in the art that many changes and modifications can be made thereto without departing from the spirit or scope of the invention as set forth herein.

I claim:

1. A method for correcting original color-separated signals in advance of preparation of printing plates in order to improve the color tone of printing results, comprising the steps:

storing in a first memory device the original color-separated signals corresponding to amounts of respective inks;

displaying the contents of the first memory device on a color monitor which is adapted to simulate the printing results;

designating the address of desired picture elements in the first memory device while making use of said picture displayed on the color monitor, and reading out the original color-separated signals of the desired picture elements from the designated addresses;

making changes to the black ink component of the read-out color-separated signals and adjusting the amou t of the rest of the inks so as to obtain a color tone equivalent to the original color-separated signals of each desired picture element, said changes and adjustments reducing the amount of the rest of the inks needed in printing with said equivalent color tone;

storing the adjusted color-separated signals in a second memory device at addresses corresponding to the desired picture elements of the original color-separated signal;

applying flags to desired picture elements in which the amounts of the respective inks have been adjusted and storing the flags in a third memory device at addresses corresponding to their original picture elements; and storing values, which indicate the amount of change of the new black ink components of each desired picture element relative to the corresponding original black ink components, in a fourth memory device at addresses corresponding to the original picture elements upon adjusting the amounts of the respective color inks.

2. A method according to claim 1, wherein upon designation of addresses of desired picture elements in the first memory device, the addresses of a group of picture elements extending out with a predetermined pattern from a central picture element designated suitably on the display screen of the color monitor are designated.

3. A method according to claim 1 or 2, wherein said addresses of a group of picture elements extending out with a predetermined pattern from a central picture element designated suitably on the display screen of the color monitor are added respectively with temporary addresses inherent to the predetermined pattern, in order to designate the addresses of the individual picture elements in the group.

4. A method according to claim 1 or 2, wherein the addresses of a group of picture elements extending out with a predetermined pattern from a central picture element designated suitably on the display screen of the color monitor are added respectively with relative addresses to the central picture element, whereby to designate the absolute addresses of the individual picture elements in the group.

5. A method according to claim 1 or 2, wherein the addresses of a group of picture elements extending out with a predetermined pattern from a central picture element designated suitably on the display screen of the color monitor are added respectively with temporary addresses inherent to the predetermined pattern and relative addresses to the central picture element and the temporary addresses and relative addresses are rendered to correspond to each other, whereby to designate the absolute addresses of the individual picture elements in the group.

6. A method according to any claim 1 or 2, wherein upon designation of desired picture elements in the first memory device, a cursor of a predetermined pattern is projected on the display screen of the color monitor on which the contents of the first memory device are displayed, said cursor designating the desired picture elements.

7. A method according to claim 1 or 2, wherein upon designation of desired picture elements in the first memory device, the display screen of the color monitor on which the contents of the first memory device are displayed is designated by a write pen so as to designate the desired picture elements.

8. A method according to claim 1 or 2, wherein the equivalent neutral density components remaining in the respective color ink components other than the black ink of the color-separated signals of the desired picture elements are added at desired ratios to the corresponding black ink components so as to make changes to the black ink components.

9. A method according to claim 1 or 2, wherein ratios, at which residual equivalent neutral density components contained in the color ink components of the picture signals of the desired picture elements in the first memory device are added to the corresponding black ink components, are given as those inherent to the respective picture elements of a picture pattern group extending out with a predetermined pattern from a central picture element designated on the display screen of the color monitor.

10. A method according to claim 1 or 2, wherein ratios, at which residual equivalent neutral density components contained in the color ink components of the picture signals of the desired picture elements in the first memory device are added to the corresponding black ink components, are given as those inherent to the respective picture elements of a picture pattern group extending out with a predetermined pattern from a central picture element designated on the display screen of the color monitor and the ratios decreases gradually at the desired picture elements are located apart from the central picture element.

11. A method according to claim 1 or 2, wherein ratios, at which residual equivalent neutral density components contained in the color ink components of the picture signals of the desired picture elements in the first memory device are added to the corresponding black ink components, are stored in the fourth memory device as values indicating the degrees of changes to the corresponding black ink components.

* * * * *